(12) United States Patent
Chan

(10) Patent No.: US 6,262,751 B1
(45) Date of Patent: Jul. 17, 2001

(54) HARDWARE ROTATION OF AN IMAGE ON A COMPUTER DISPLAY

(75) Inventor: Yung Ling Chan, Kowloon (HK)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/179,032

(22) Filed: Oct. 26, 1998

(51) Int. Cl.$^7$ .................................................. G06F 12/06
(52) U.S. Cl. .......................... 345/572; 345/571; 345/545
(58) Field of Search ..................................... 345/126, 501, 345/507–509, 515, 516, 545, 571, 572, 531, 530, 564; 382/293, 295, 296, 297

(56) References Cited

U.S. PATENT DOCUMENTS

| | | | |
|---|---|---|---|
| 4,716,533 | 12/1987 | Ohmori | 345/516 |
| 4,776,026 | 10/1988 | Ueyama | 382/296 |
| 4,931,960 | 6/1990 | Morikawa | 358/1.11 |
| 4,952,920 | 8/1990 | Hayashi | 345/126 |
| 5,063,526 | 11/1991 | Kagawa et al. | 395/455 |
| 5,133,076 | 7/1992 | Hawkins et al. | 395/800 |
| 5,199,101 | 3/1993 | Cusick et al. | 398/1.16 |
| 5,384,645 | 1/1995 | Hasegawa et al. | 358/444 |
| 5,432,720 | 7/1995 | Lucente et al. | 364/708.1 |
| 5,450,542 | 9/1995 | Leman et al. | 345/512 |
| 5,563,625 | 10/1996 | Scott | 345/126 |
| 5,566,098 | 10/1996 | Lucente et al. | 364/708.1 |
| 5,577,182 | 11/1996 | Hayashi | 345/437 |
| 5,584,032 | * 12/1996 | Hyatt | 711/100 |
| 5,598,181 | 1/1997 | Kermisch | 345/126 |
| 5,606,348 | 2/1997 | Chin | 3445/213 |
| 5,613,018 | 3/1997 | Eldridge | 382/296 |
| 5,634,088 | 5/1997 | Banton | 358/1.02 |
| 5,668,980 | 9/1997 | Schieve | 345/523 |
| 5,670,982 | 9/1997 | Zhao | 345/126 |
| 5,692,210 | 11/1997 | Mita et al. | 395/800 |
| 5,712,714 | 1/1998 | Sasahara | 358/474 |
| 5,715,385 | 2/1998 | Stearns et al. | 345/436 |
| 5,734,875 | * 3/1998 | Cheng | 345/516 |
| 5,933,861 | * 8/1999 | Lee et al. | 711/218 |

FOREIGN PATENT DOCUMENTS

| | | | |
|---|---|---|---|
| 0 582 824 | 2/1994 | (EP) | G06F/15/62 |
| WO 91/00586 | 1/1991 | (WO) | G09G/1/06 |

* cited by examiner

Primary Examiner—Kee M. Tung

(57) ABSTRACT

An address generator (FIG. 6) of a display controller (16) includes an adder (62) that repetitively adds an image-row-offset value to the address generator's address output so that data sequentially fetched from a refresh memory (18) to refresh a display (20) properly represent the image data even though the display scanning orthogonal to the image data's sequence in the refresh memory. As the data are fetched, an omega network (90) re-orders the bits within the fetched data words in accordance with the current display scan so that the display will receive proper data even though each location contains data for a plurality of pixels in an orthogonally oriented image row.

16 Claims, 13 Drawing Sheets

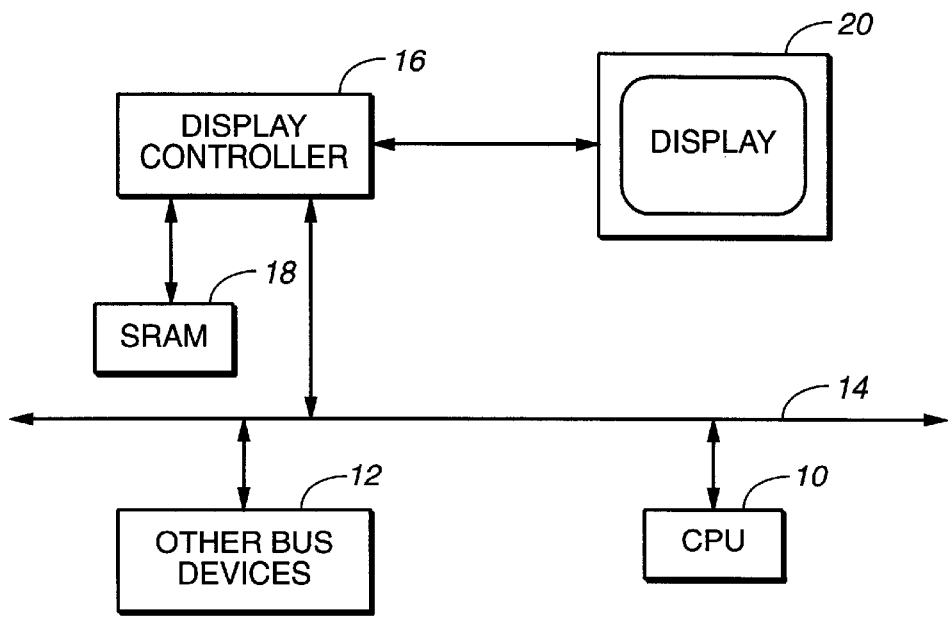
FIG._1
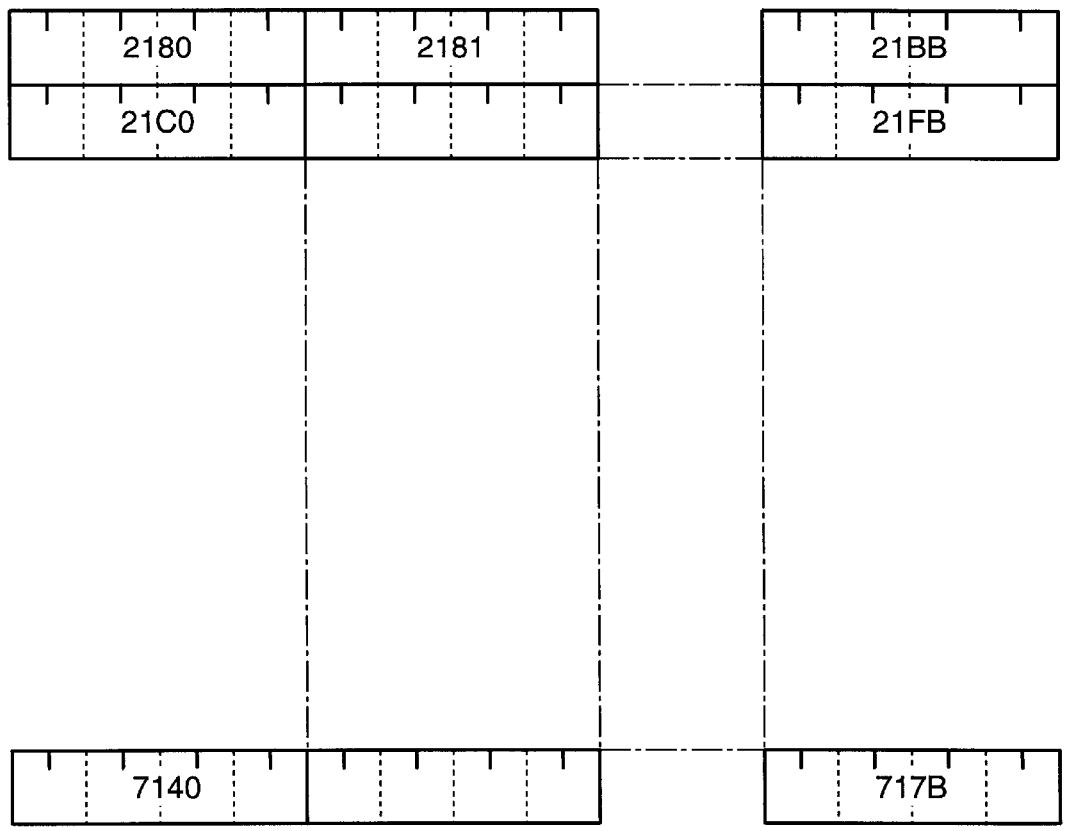
FIG._8

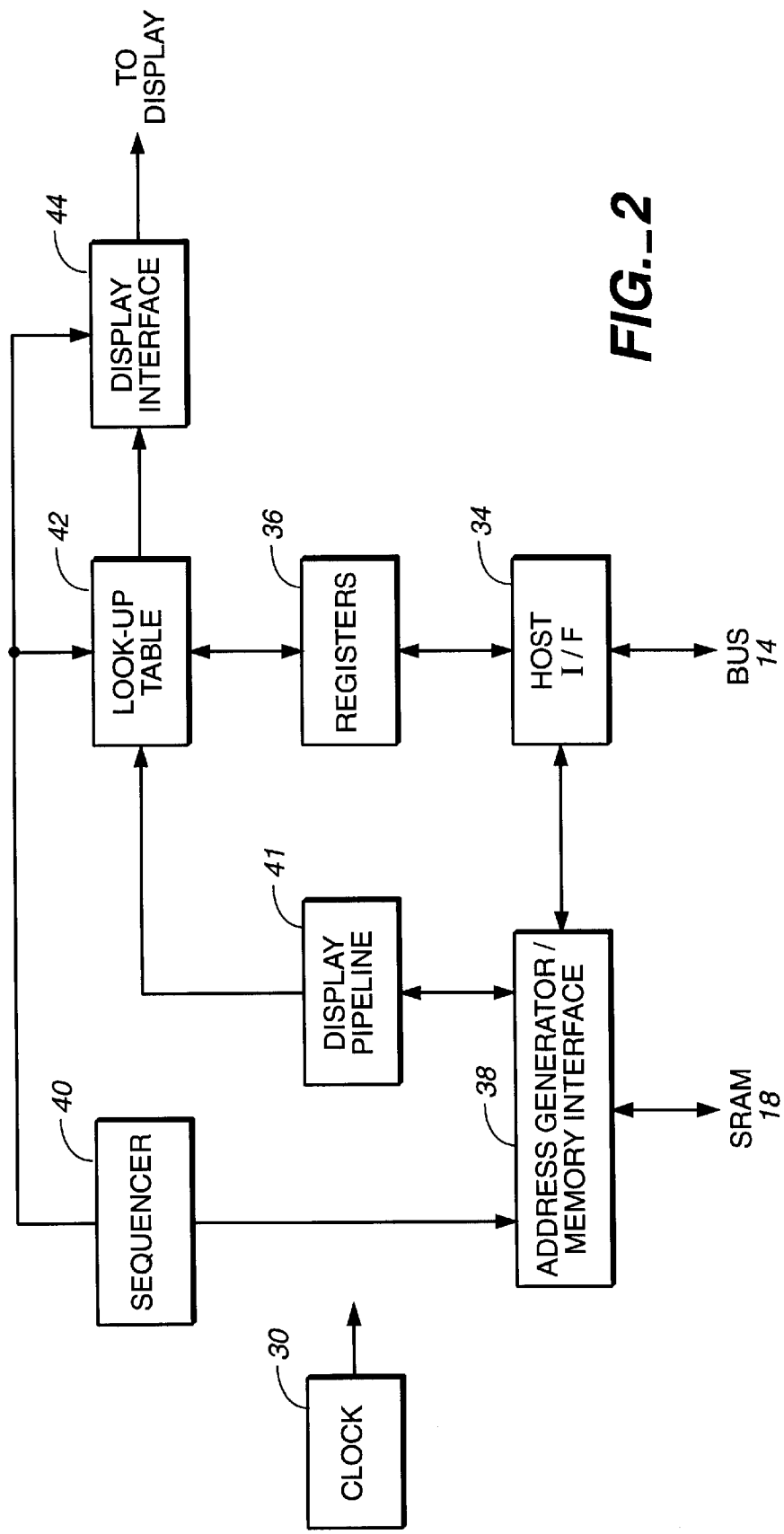
FIG._2

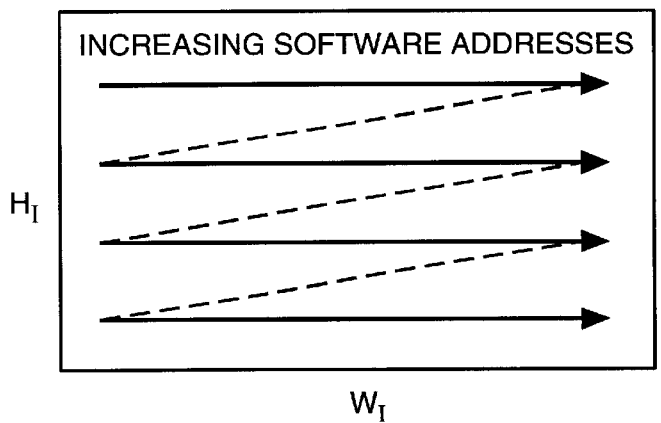
FIG._3a
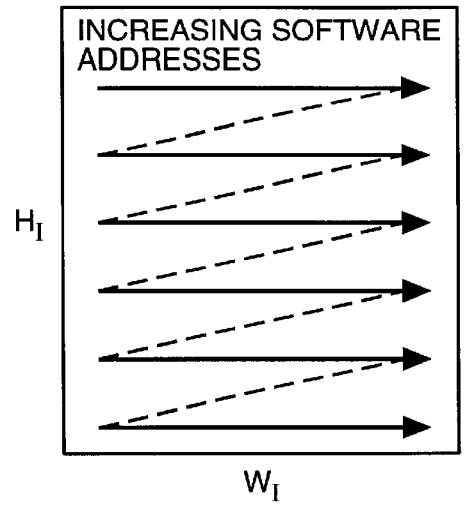
FIG._4a
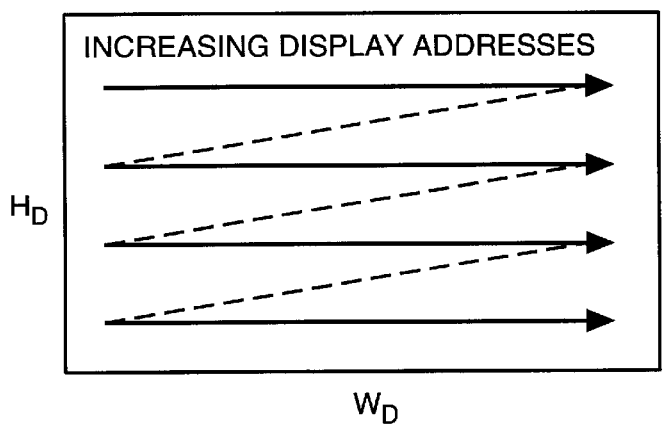
FIG._3b
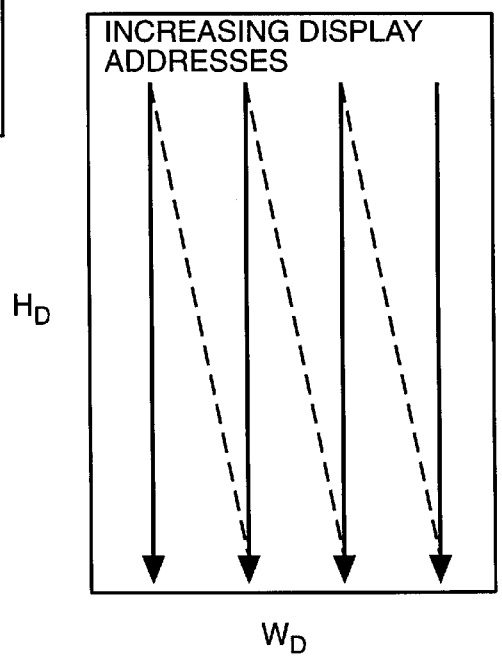
FIG._4b

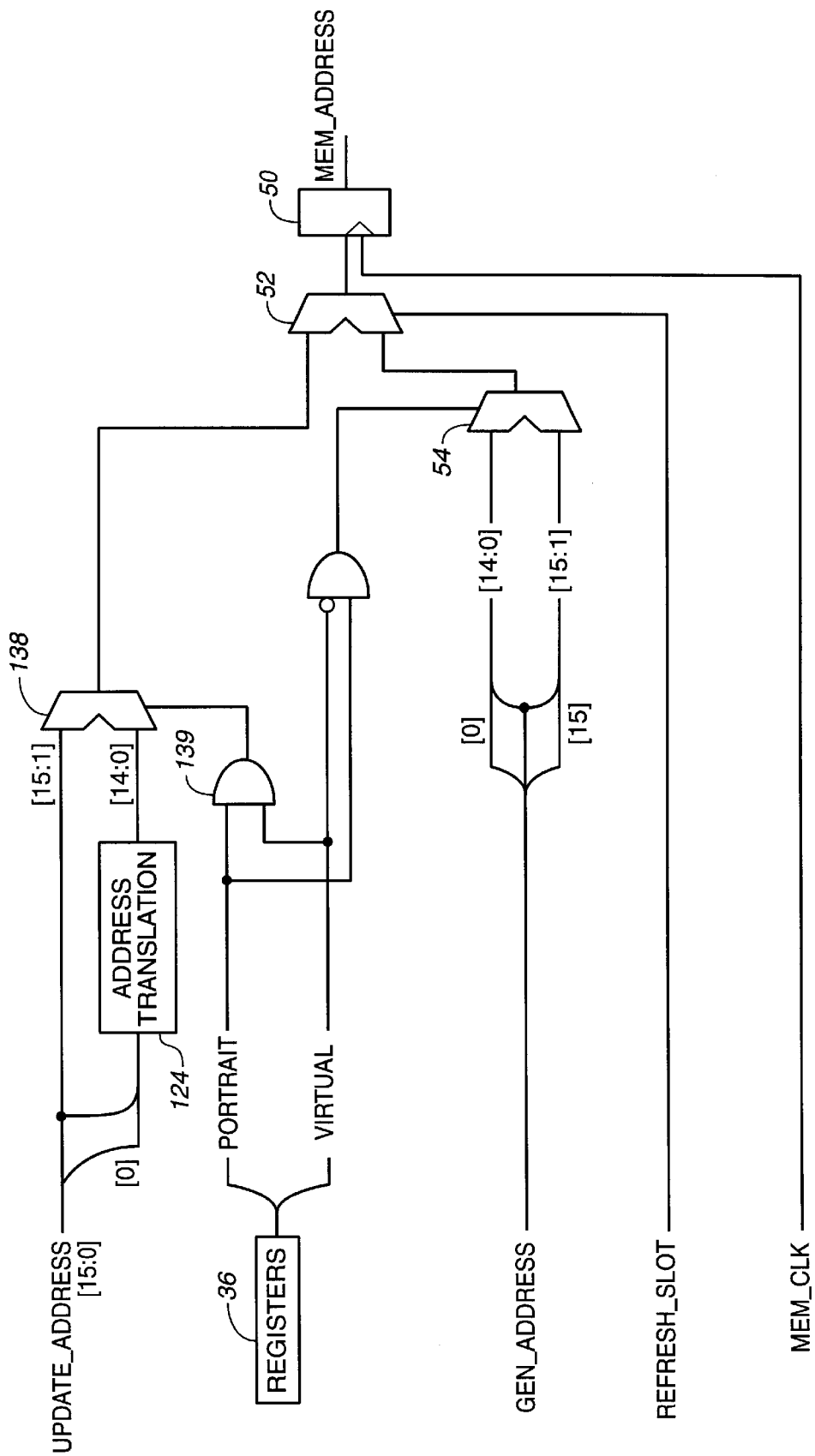
FIG._5

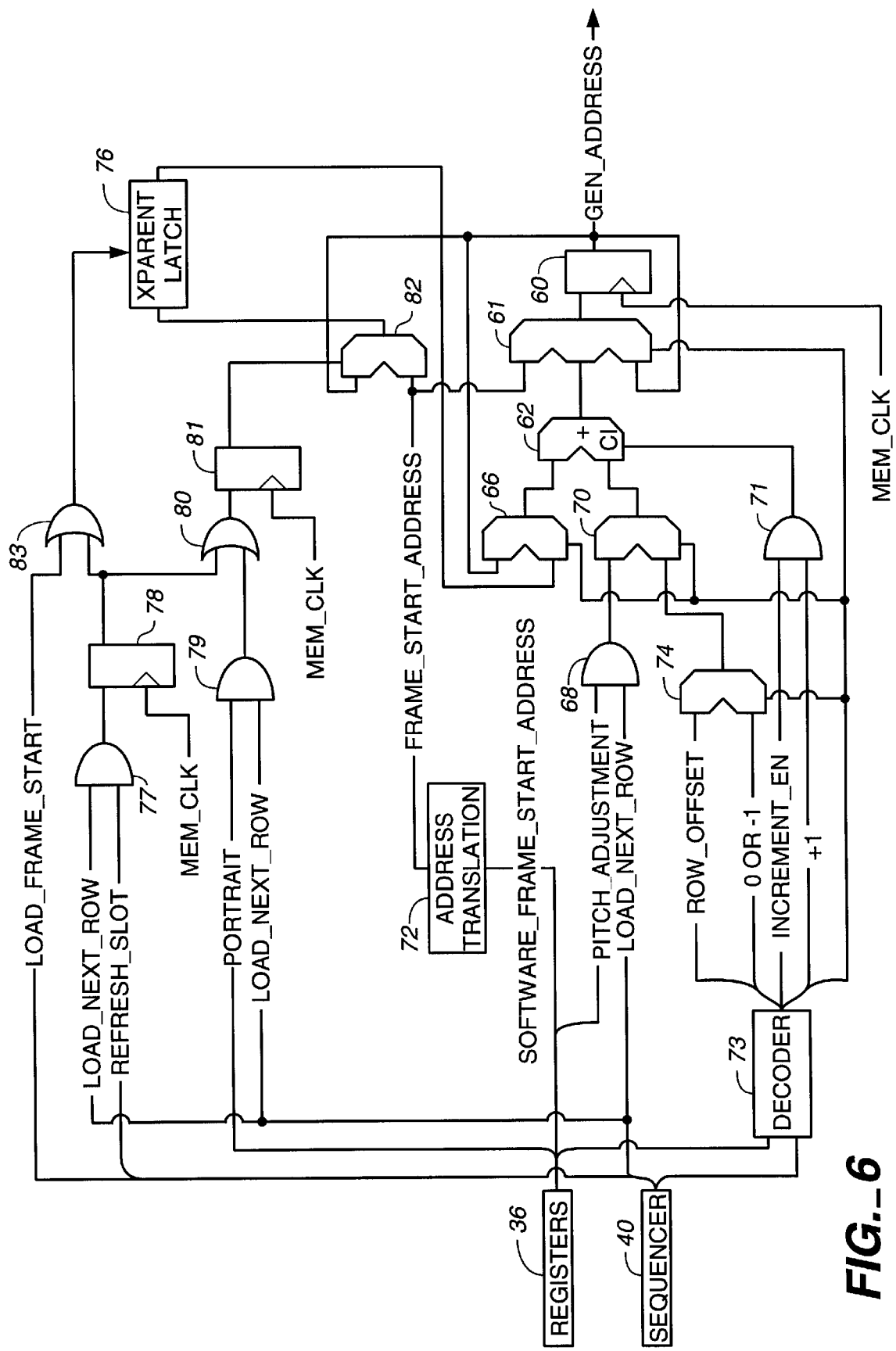
FIG._6

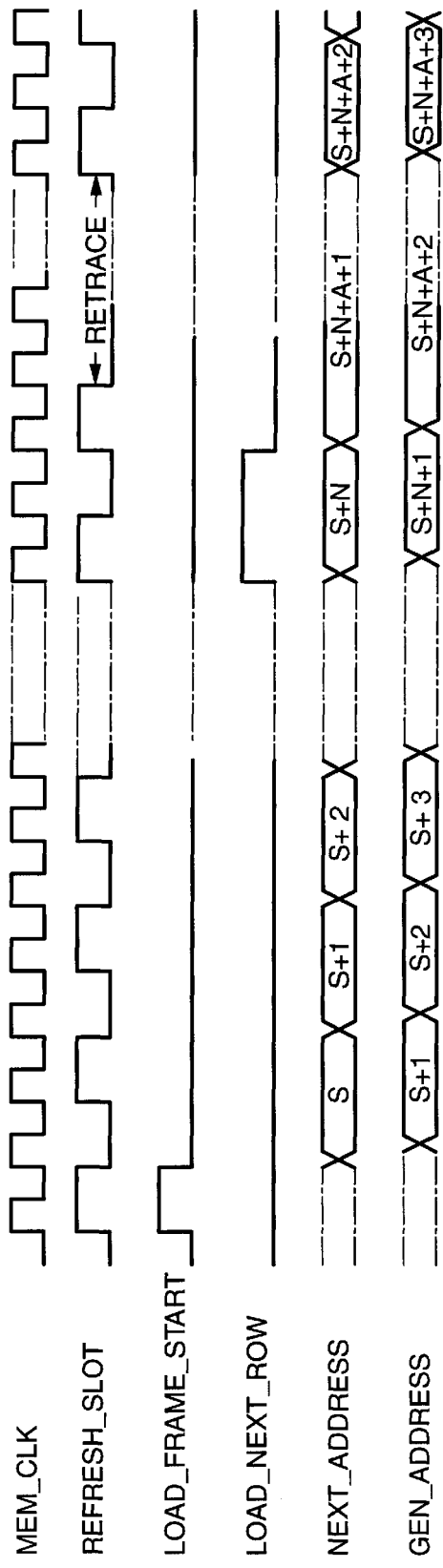
FIG._7a
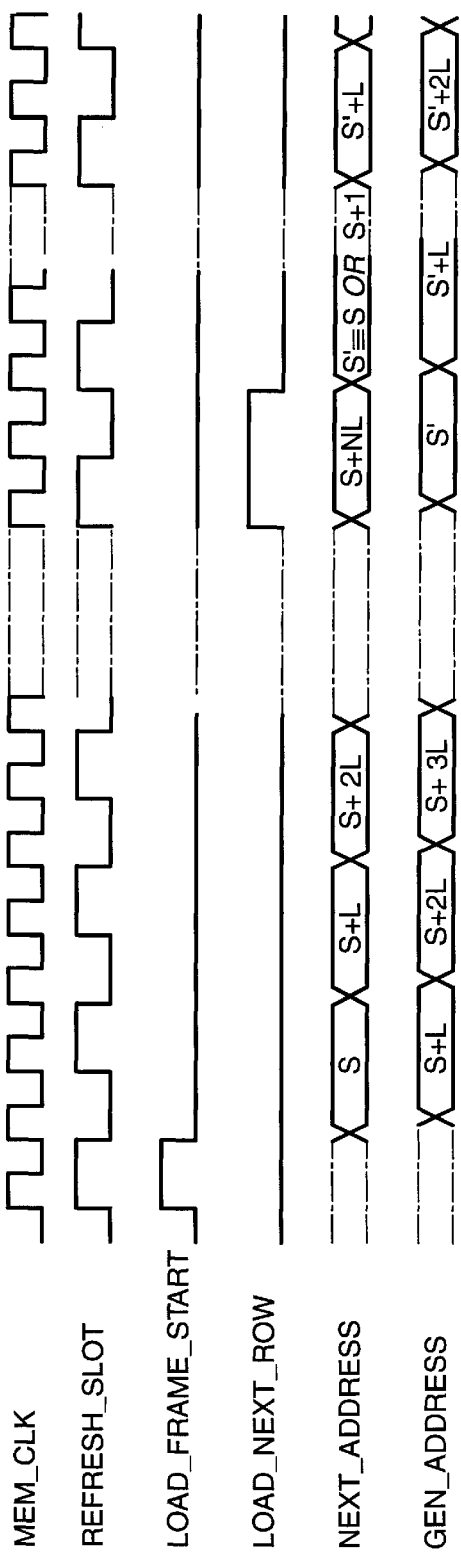
FIG._7b

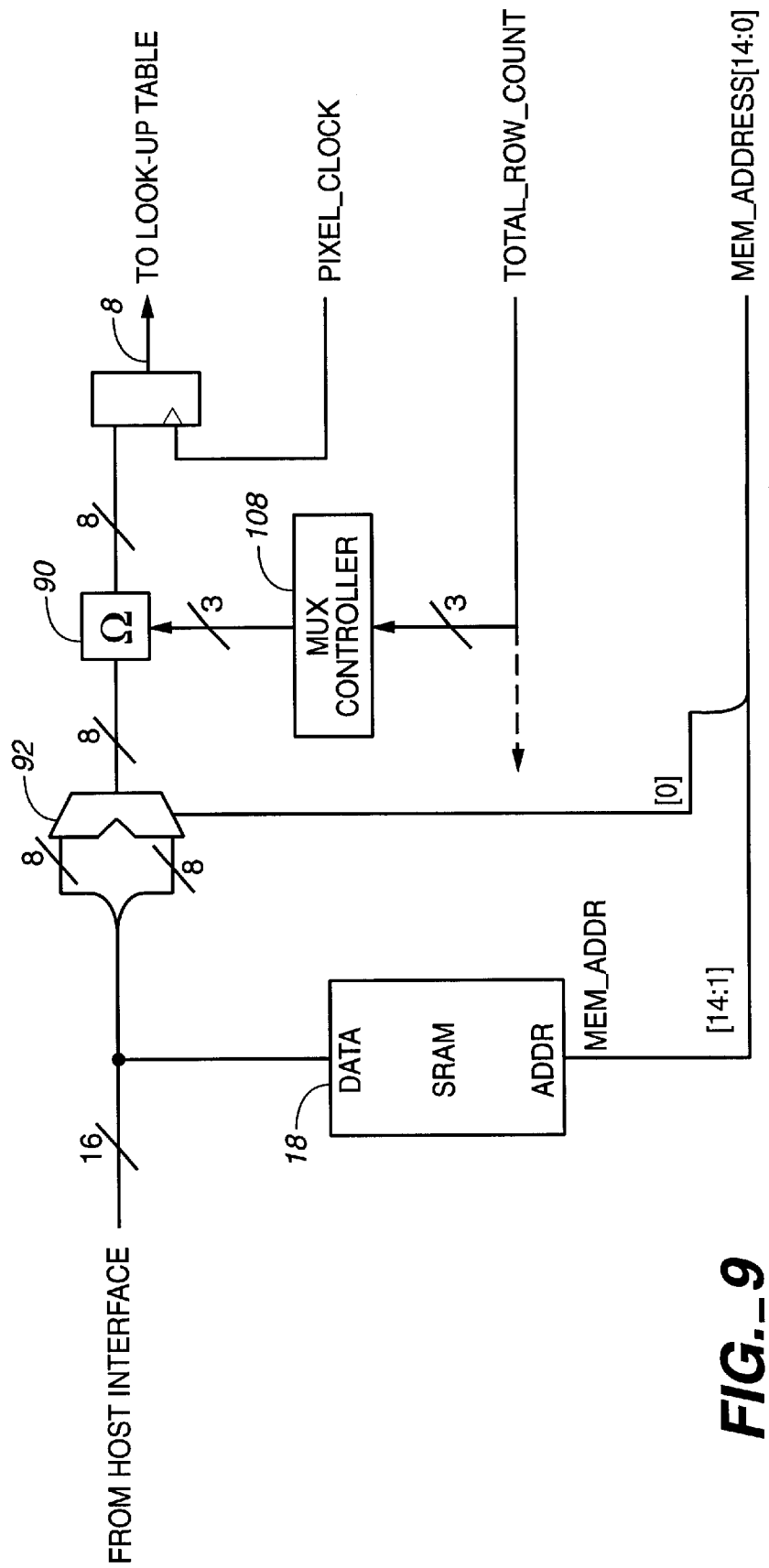
FIG._9

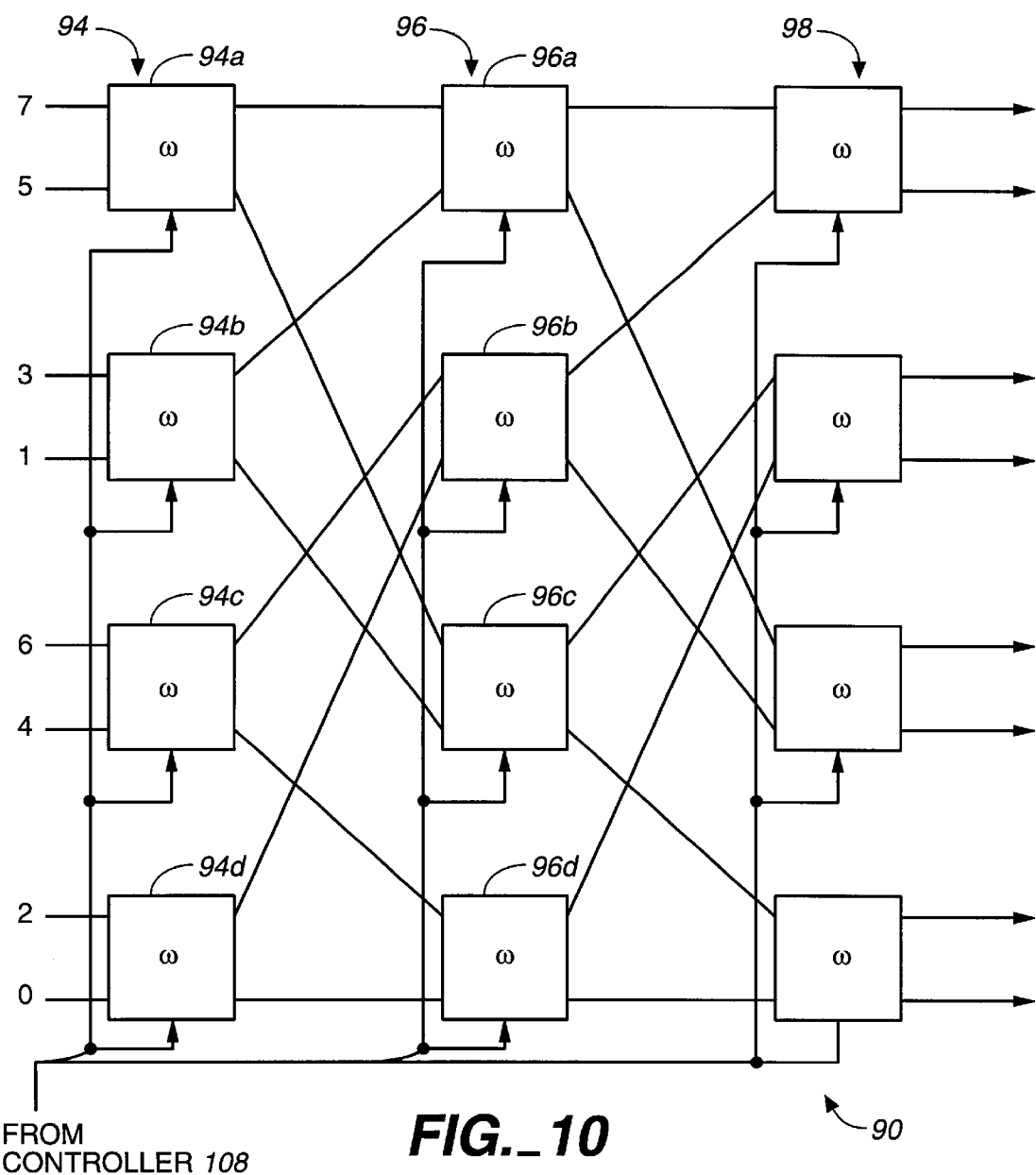
FIG._10
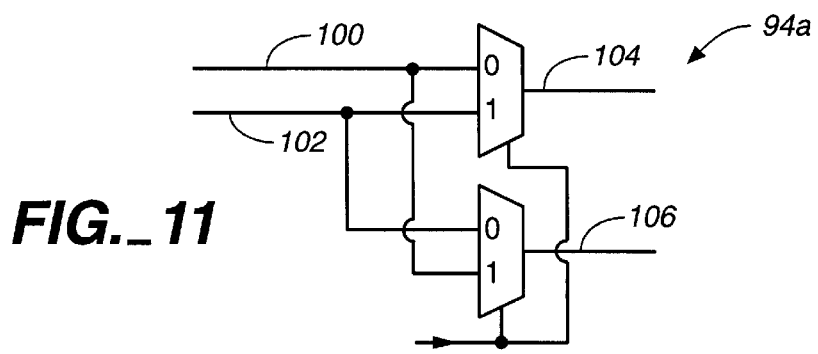
FIG._11

|  | SWITCH BANK 94 | SWITCH BANK 96 | SWITCH BANK 98 |
|---|---|---|---|
| SCAN LINE 0 | 1 | 1 | 0 |
| SCAN LINE 1 | 0 | 1 | 0 |
| SCAN LINE 2 | 1 | 0 | 0 |
| SCAN LINE 3 | 0 | 0 | 0 |

FIG._12

|  | SWITCH BANK 94 | SWITCH BANK 96 | SWITCH BANK 98 |
|---|---|---|---|
| SCAN LINE 0 | 1 | 1 | 1 |
| SCAN LINE 1 | 0 | 1 | 1 |
| SCAN LINE 2 | 1 | 0 | 1 |
| SCAN LINE 3 | 0 | 0 | 1 |
| SCAN LINE 4 | 1 | 1 | 0 |
| SCAN LINE 5 | 0 | 1 | 0 |
| SCAN LINE 6 | 1 | 0 | 0 |
| SCAN LINE 7 | 0 | 0 | 0 |

FIG._13

|  | SWITCH BANK 94 | SWITCH BANK 96 | SWITCH BANK 98 |
|---|---|---|---|
| SCAN LINE 0 | 1 | 0 | 0 |
| SCAN LINE 1 | 0 | 0 | 0 |

FIG._14

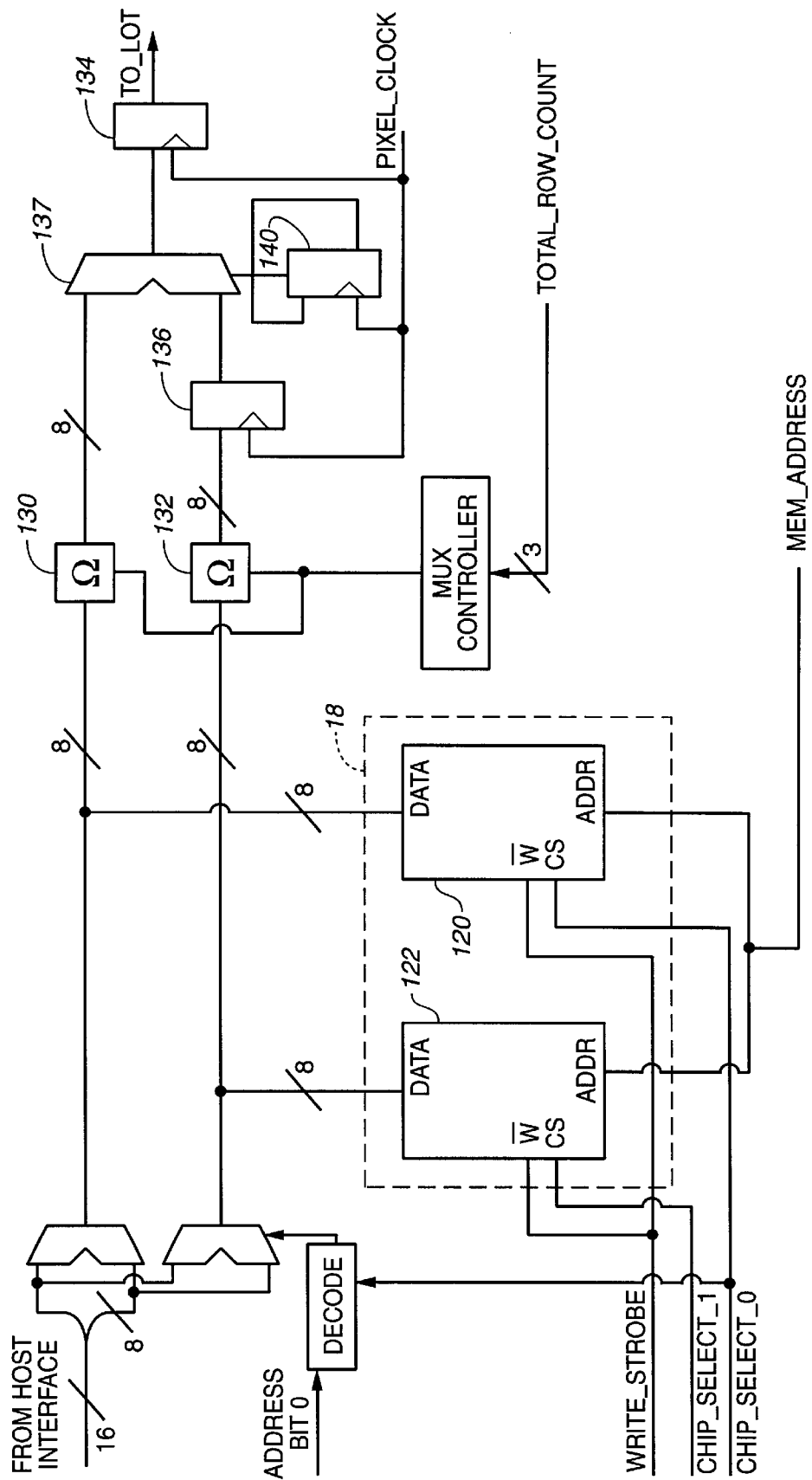
FIG._15

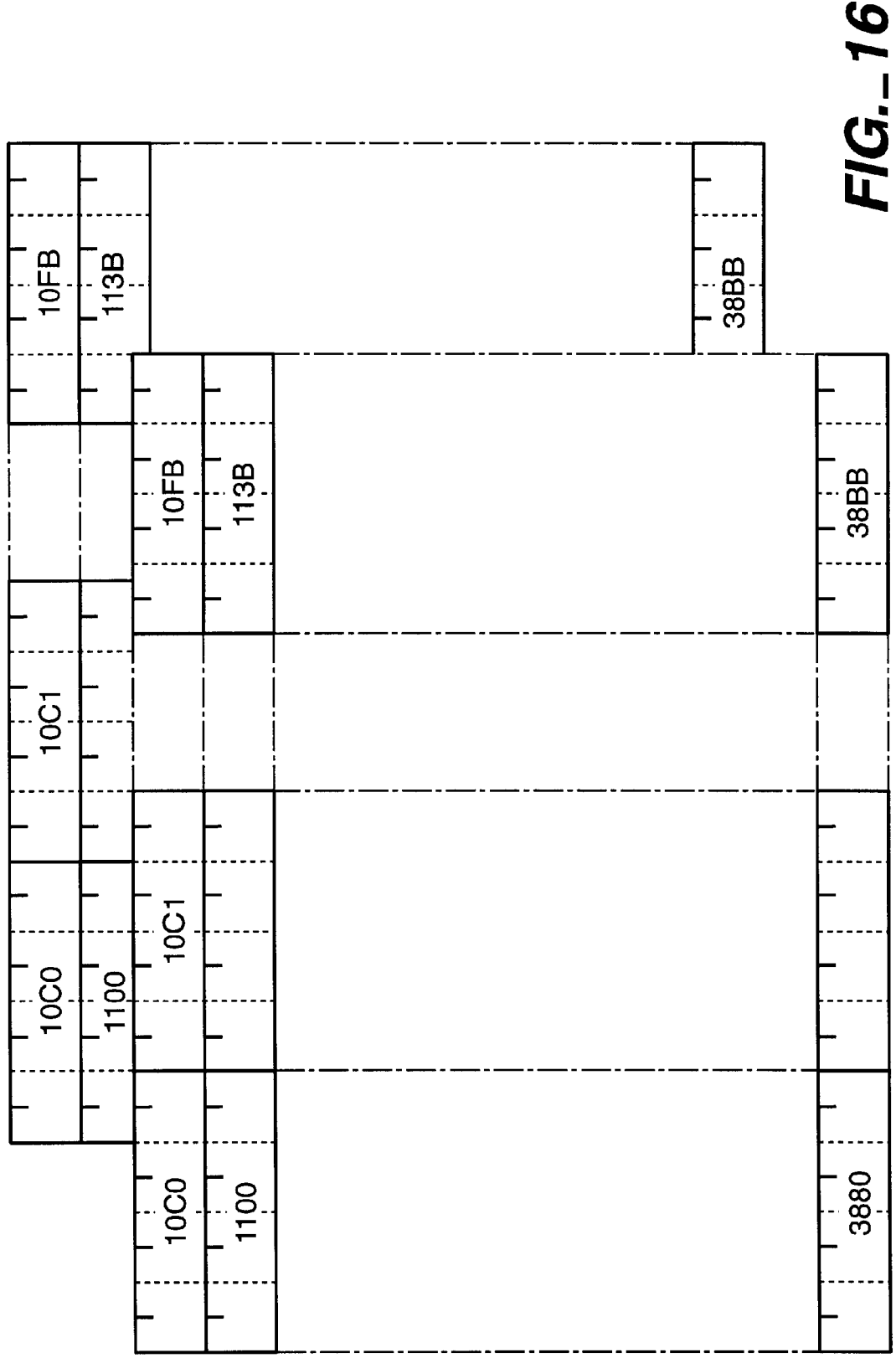
FIG._16

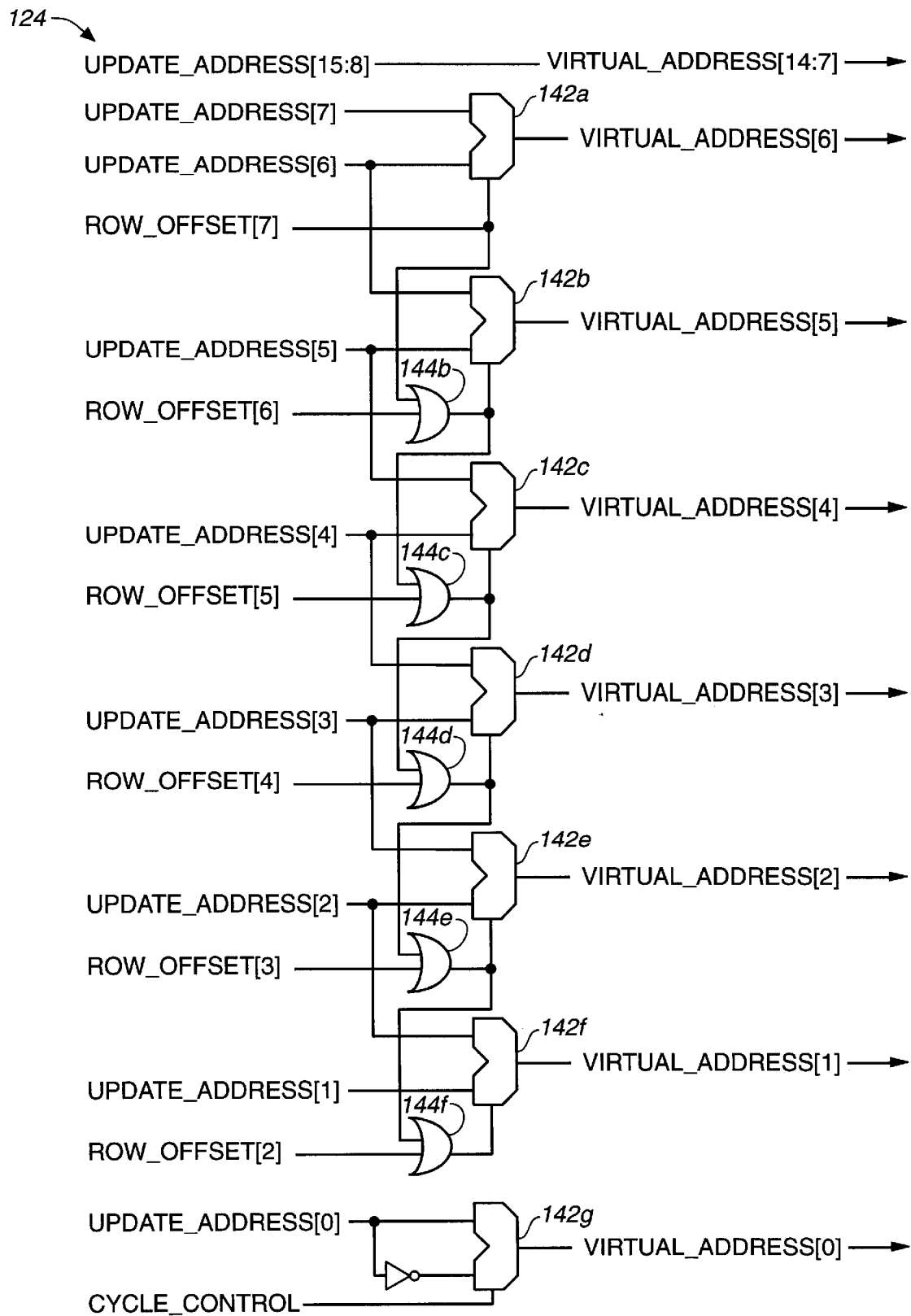
FIG._17

HARDWARE ROTATION OF AN IMAGE ON A COMPUTER DISPLAY

BACKGROUND OF THE INVENTION

The present invention is directed to image display and in particular to systems for refreshing a display device in accordance with a refresh memory.

Cathode-ray-tube (CRT), liquid-crystal-display (LCD), and some other types of display mechanisms employ periodic refreshing. In the case of a CRT display, for instance, an electron beam scans phosphors on the display screen at a rapid rate to keep the image visible. To this end, a refresh memory contains pixel data representing values of picture elements of which the image consist, and these data are fetched from memory in the order in which screen locations need to be "painted."

Particularly in the case of some small, hand-held displays, it is valuable to be able to vary the image display's orientation. An image whose longer dimension is vertical is referred to as having a "portrait" orientation, while an image whose horizontal dimension is longer is referred to as having a "landscape" orientation.

As a typical image to be displayed does, the typical display device has one dimension that is longer than the other, and in some smaller displays it is convenient to allow the user to orient the display in either the portrait or the landscape orientation, in accordance with the particular image for which the display device is being used. Now, it is impractical from a hardware standpoint for the display device to have its scanning changed in accordance with the particular orientation in which the display device is held or mounted. That is, the display device is typically so made as to scan successive display locations along a scan line that extends in the display's long-dimension direction, without regard to whether that direction is horizontal or vertical.

But, it is convenient from a programming standpoint to be able to refer to pixel locations in accordance with the intended image orientation: successive addresses should advance horizontally without regard to the display device's scan direction. That is, it is convenient to be able to refer to pixel locations sequentially along a portrait-oriented image's horizontal direction even though the display device will not retrieve image data from the memory in that sequence. This means that supporting hardware should compensate for display-device scan-direction changes so that they are transparent to that programmer.

One way of accomplishing this is to provide hardware that translates the programmer's software addresses into memory locations whose sequence matches the display-devices scanning sequence, and there are some applications in which this approach is desirable. But it is sometimes preferred, from a hardware-design standpoint, not to be required to make such translations in real time, since update addresses can occur in random order, complicating the translation process.

SUMMARY OF THE INVENTION

I have therefore devised an approach that permits the update data to be stored in refresh-memory locations whose sequence matches the normal image-scanning sequence, not the hardware device's scanning sequence. For fetching refresh data, I employ an address generator that repetitively advances its output values by a software-address row offset as it retrieves data for successive pixel locations along a display row. In accordance with the particular display row for which the data are being fetched, moreover, I reorder the bits fetched from a single memory location before using them for driving the display device. In this way, I am able to display the image data properly even though several pixels' worth of data may have been stored in each memory location. In accordance with another aspect of the invention, I store successive image rows in commonly addressed locations of different memory modules so that a plurality of display pixels' data in a given display row can be fetched simultaneously even though those data represent different image rows.

BRIEF DESCRIPTION OF THE DRAWINGS

The invention description below refers to the accompanying drawings, of which:

FIG. 1 is a block diagram of the type of computer system that can employ the present invention's display-memory organization;

FIG. 2 is more-detailed view of FIG. 1's display controller;

FIGS. 3a and 3b are diagrams depicting the relationship between image-space and display-scanning sequences for a landscape-oriented image;

FIGS. 4a and 4b are diagrams similar to FIGS. 3a and 3b but illustrating sequences for portrait-oriented image;

FIG. 5 is a block diagram of the memory-interface portion of FIG. 2's address-generator/memory-interface module;

FIG. 6 is a block diagram of that module's address-generation circuitry;

FIGS. 7a and 7b are timing diagrams depicting address generation for the system's landscape and portrait modes, respectively;

FIG. 8 depicts one form of portrait-mode memory organization employed by the illustrated embodiment;

FIG. 9 is a block diagram of the illustrated embodiment's memory module and display pipeline;

FIG. 10 is a block diagram of the omega network that FIG. 9's display pipeline employs;

FIG. 11 is a more-detailed block diagram of one of FIG. 10's individual omega-network switches;

FIG. 12 is a table depicting the relationship between omega network selection signals and scan lines that the illustrated embodiment employs in its portraits mode when each memory location contains four pixels' worth of data;

FIG. 13 is a similar table employed by the illustrated embodiment when each location contains eight pixels' worth of data;

FIG. 14 is a similar table for two pixels' worth of data per location;

FIG. 15 is a block diagram of the memory modules and display pipelines employed by an alternate embodiment of the present invention;

FIG. 16 depicts the memory organization for the embodiment of FIG. 15;

FIG. 17 is a logic diagram of an address-translation network employed by the alternate embodiment of FIGS. 15 and 16.

DETAILED DESCRIPTION OF AN ILLUSTRATIVE EMBODIMENT

Figure 18:
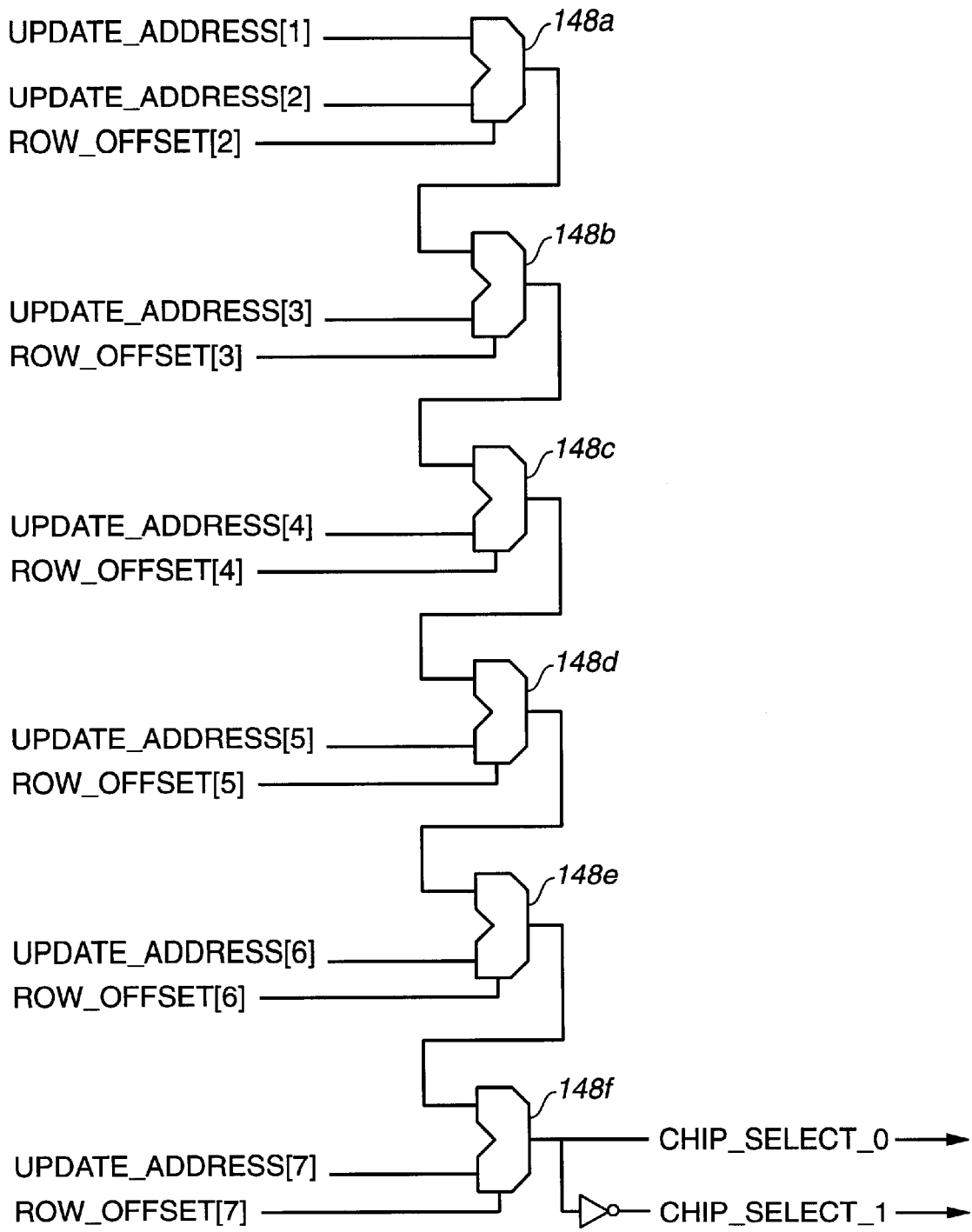
FIG. 18 depicts that embodiment's memory-chip-selection circuitry.

FIG. 1 is a block diagram of a typical computer system. A central processing unit ("CPU") 10 communicates with other bus devices 12 by way of a bus 14, which also provides the CPU access to a display controller 16. The CPU sends the display controller image-update data and corresponding addresses that tell the controller 16 where to store the data in an image memory, static RAM 18. Concurrently, the display controller 16 uses the data thus stored to provide data with which to refresh a display device 20.

FIG. 2 depicts the display controller in more detail. Clock circuit 30 operate to provide timing for the entire display controller. A host interface module 34 responds to bus signals directed by the central-processing unit to the display controller. Such commands may direct that on-board configuration registers 36 be loaded with specified values, or they many cause those values to be read out so that the host interface 34 can transmit the values over the bus 14 to the central-processing unit.

Other signals from the central-processing unit may cause the host interface module 34 to operate interface circuitry in the address-generator and memory-interface module 38 to load the image memory 18 or to fetch data from it. A sequencer 40 operates the address generator and memory interface 38 to cause it to provide a display pipeline 41 refresh data for the display. Typically, the data specify selections from a palette that a look-up table 42 contains, and data thus fetched from the look-up table are converted by a display-interface module 44 into signals appropriate for driving the display.

When the central-processing unit "updates" the display memory 18, it sends the memory not only the pixel's value but also its location within the image. FIGS. 3a and b illustrate a typical association of image orientation refresh sequence for a landscape-orientated image. Address values of locations containing data for successive pixels along an image row typically increase from left to right. If each memory location contains the data for only one pixel, the data for one pixel are contained in a memory location whose address is one greater than that of the memory location that contains the data for the pixel to the left of it in the same image row. If each location contains data for more than one pixel, the memory address increases by one for every n pixels, where n is the number of pixels whose data a single location contains.

For a landscape-oriented image, the typical display device repaints new pixels in essentially the same sequence, proceeding from left to right within a row and scanning rows successively from top to bottom. Therefore, generation of the addresses from which refresh data should be fetched is relatively straightforward: successive addresses increase by one as a row is scanned, and a new row start address is computed as, say, an offset from the previous row start address at the beginning of every row.

When the image has a portrait orientation, i.e., when its vertical dimension exceeds its horizontal dimension, it still is usually convenient to specify addresses as increasing in the image's rows left to right, with all addresses in a given image row being greater than any address in the image row below. Because of speed considerations, though, it is best for the actual display device not to scan in the same direction; as FIGS. 4a and 4b illustrate, image data may be specified with addresses that proceed in a sequence that FIG. 4a depicts, but the display device for presenting that image will typically be scanned as FIG. 4b indicates, i.e., beginning at the upper right and scanning downward in vertical rows that proceed from right to left. In such an arrangement, there must be either a more-complicated transformation of image position to memory address or a more-complicated generation of the refresh-address sequence.

The display system that will now be described employs the latter approach: the succession of memory addresses roughly follows the conventional image-location sequence, and refresh-address generation is performed in a sequence that compensates for the different scan orientation of the display device. The way in which it does so will be discussed in connection with FIGS. 5 and 6, which are respectively the memory-interface and address-generation parts of FIG. 2's module 38.

As FIG. 5 illustrates, the memory-interface circuitry includes an output latch 50. Latch 50's output is display memory 18's address input. A MEM_CLK signal pulses latch 50 fast enough to intersperse display-refresh accesses with central-processor accesses. The level of a REFRESH_SLOT signal from the sequencer determines whether latch 50 receives multiplexer 52's lower, refresh-address input or its upper, update-address input.

Of most interest in the present context are the addresses provided for refreshing the display, and these are the output of a further multiplexer 54. For reasons that will become apparent as the discussion proceeds, multiplexer 54 applies either bits [14:0] or [15:1] of a 16-bit GEN_ADDRESS signal generated in a manner that will now be explained in connection with FIG. 6.

We first consider the address generation in the landscape mode. To generate memory addresses, a latch 60 loads in a multiplexer 61's output upon each pulse of a memory-clock signal MEM_CLK. Multiplexer 61 ordinarily alternates between feeding back latch 60's GEN_ADDRESS output and forwarding the output of a memory-calculation adder 62. As FIG. 7A illustrates, the memory-clock signal MEM_CLK usually toggles REFRESH_SLOT, which delimits refresh-access periods. These alternate with CPU periods, in which the CPU updates the image memory or reads from it. REFRESH_SLOT's frequency in the landscape mode equals that of the pixel clock divided by the number of pixels per memory location.

As the display is scanning a row in the landscape mode, a multiplexer 66 forwards the current memory address to one of the adder 62's input ports. The other input port normally receives a zero value forwarded from a disabled AND-gate bank 68 by a multiplexer 70, but the adder also receives a "1"-valued carry from a gate 71 so that the adder's output value NEXT_ADDRESS (FIG. 7A) is one greater than the current memory address. The address generator's output is therefore incremented on every second MEM_CLK pulse, when multiplexer 61 forwards it adder 62's output.

When the display reaches the end of a row, the sequencer 40's LOAD_NEXT_ROW output enables AND-gate bank 68's forwarding of the registers' PITCH_ADJUSTMENT output, which is one less than the difference between the addresses for one display row's last pixel value and the next display row's first. When a complete stored image is being displayed, this value is typically zero. But the displayed image is often only a part of the stored image, about which the user can pan, and adding a non-zero PITCH_ADJUSTMENT value cuts off the part of the stored image to the left and/or right of the part to be displayed.

Address generation continues in this fashion until the display has finished its last row. When it has, the address value should return to the address of the start of the image, which the CPU has loaded into the registers 36 so that it appears as their SOFTWARE_FRAME_START_ADDRESS output. In the landscape mode, an address-translation circuit 72 passes this address unmodified as FRAME_START_ADDRESS to multiplexer 61, and at the beginning of a frame a decoder 73 momentarily causes multiplexer 61 to forward this value instead of the adder output. This is therefore the value that the output latch initially presents as the address generator's output. Address generation then continues as just described.

Portrait-mode address generation differs from the above-described landscape-mode generation. This can be appreciated by considering FIG. 8. That drawing depicts the memory space allocated to a portrait-mode image. For the sake of example, the image is taken to be 240 pixels wide by 320 pixels long. The pixel data represent choices from a four-color palette, so two bits are required for each pixel, and we will assume that each memory location contains a single byte and therefore can contain data for four pixels.

FIG. 8 depicts the image data as beginning at (hexadecimally expressed) location 2180, with the first (portrait-oriented) row's data ending at location 21BB. In the illustrated example, the second row begins at memory location 21C0. Since the display device is scanned in its long direction, along successive (landscaped-scanned) display columns, the data need to be fetched from successive (portrait-oriented) image-row positions. So screen refreshing must begin with data from location 21BB, which contains data for the portrait-oriented image's upper-right corner, even though the memory block allocated to the image data starts with the portrait-oriented image's upper-left-corner data at memory location 2180.

Additionally, the addresses of successively fetched pixel data must differ by a row offset, which is $40_{16}$ in the example. To achieve this, the decoder 73 causes multiplexer 70 to draw the adder 62's lower input from a further multiplexer 74, which the decoder normally causes to forward the decoder's ROW_OFFSET output. And the decoder de-asserts its INCREMENT_EN output so that gate 71 no longer applies a carry input to the adder. The adder output therefore increases by the portrait-row offset with every second MEM_CLK pulse as the display proceeds along a landscape row, so the output latch 60's GEN_ADDRESS output does, too.

When the display starts a new (landscape) row, the decoder 73 causes multiplexer 74 to supply a decoder-generated "0" or "−1" value as the input that multiplexer 70 forwards to the adder 62's lower input port, and it causes multiplexer 66 to draw the adder's upper input from a start-of-row transparent latch 76 rather than the output latch 60. As will be explained presently, latch 76's output is the address of the memory location containing pixel data for the start of the display row that has just been completed.

If each location holds more than one pixel value, the next display row's first pixel may be in the same location as the previous row's, in which case the decoder 73 supplies multiplexer 74 a "0" value so that the new display row's initial input is drawn from the same memory location as the previous row's. Location 21BB, for example, contains the data for the first pixel in each of four successive display rows (image columns), so data fetching should start there for each of four successive display-row scans. When the fifth row is to start, the decoder supplies multiplexer 74 a "−1" and thereby causes the next row's initial input to be drawn from the location that precedes the one from which the previous row's initial input was drawn.

At the beginning of a display row, the sequencer 40 asserts the LOAD_NEXT_ROW signal to cause an AND gate 77 to forward the REFRESH_SLOT signal momentarily to a latch 78. Enabled by the registers' portrait-mode-indicating PORTRAIT signal, an AND gate 79 also forwards the LOAD_NEXT_ROW signal through an OR gate 80 to a further latch 81. On the next MEM_CLK pulse, therefore, latch 81's output assumes the level that causes a multiplexer 82 to forward its upper input, GEN_ADDRESS, to the transparent latch 76, while latch 78's output, forwarded by an OR gate 83, assumes the level that switches the transparent latch 76 to its transparent state, in which it simply forwards that GEN_ADDRESS input. The REFRESH_SLOT pulse then ends, disabling AND gate 77 so that the next MEM_CLK pulse causes a latch-78 output that returns the transparent latch 76 to its latched state, in which it retains the then-prevailing GEN_ADDRESS, i.e., the address of the location containing the data for the pixel at the beginning of the current display row.

As was mentioned above, the transparent latch 76 ordinarily retains this value through the end of the display-row scan, when 0 or −1 is added to it to determine the address for the start of the next display row. At the beginning of a new frame, though, the sequencer 40 momentarily asserts LOAD_FRAME_START through OR gate 83 so that the transparent latch 76 momentarily assumes its transparent state. This occurs while multiplexer 82 is forwarding the FRAME_START_ADDRESS signal, so that signal's value replaces the last row's row-start value.

In the portrait mode, the address-translation circuit 72 may simply forward the SOFTWARE_FRAME_START_ADDRESS signal representing the value that the CPU loads into the registers to indicate where image-data retrieval should start. But it may instead translate the start address in order to accommodate a memory organization described below that reduces the requisite memory-clock frequency.

As was mentioned above, individual memory locations may contain data for more than one pixel, and this makes it necessary for the address generator in portrait-mode operation to repeat a sequence of memory-location addresses several times for successive display-device row scans. This means that the memory output represents the data for the same sets of pixel locations each time the address generator generates the same memory sequence, but those locations' particular bits that should control the display change from scan to scan. To select the proper bits for a given scan, the display system employs FIG. 9's omega network 90, which is part of FIG. 2's display pipeline 41.

FIG. 9 depicts the image memory 18 as actually being organized in 16-bit locations, rather than the 8-bit locations that FIG. 8 suggests. This is because the refresh side of the system may, say, employ a multiplexer 92 to select between the memory output's upper two bytes and its lower two bytes in accordance with the MEM_ADDRESS signal's least-significant bit.

FIGS. 10 and 11 depict the omega network in more detail. As FIG. 10 shows, the omega network 90 is a three-stage network, comprising three switch-network stages 94, 96, and 98. Each stage includes four switch networks of the type depicted in FIG. 11. Each switch circuit includes upper and lower input lines 100 and 102 as well as upper and lower output lines 104 and 106. Each of the switching circuits either forwards the upper and lower input-line signals to the upper and lower output lines, respectively, or switches the signals so that the lower output signal is the upper input signal, and the upper output signal is the lower input signal. The choice of whether to forward or switch in a given stage is made in accordance with the signal on a respective one of three select outputs from a multiplexer controller 108 (FIG. 9).

As FIG. 10 indicates, the top switch circuit 94a in the first switch bank receives bits 7 and 5, where bit 7 is the most-significant bit. The next switch circuit 94b receives bits 3 and 1, circuit 94c receives bits 6 and 4, and circuit 94d receives circuits 2 and 0. In other words, the upper half of the switch circuits in a given stage receives the odd-numbered bits in descending order, while the lower ones receive the even-numbered bits in descending order. Similarly, if the first stage's outputs are considered numbered in descending order from top to bottom, the second-stage circuits 96a and 96b receive the odd-numbered first-stage outputs in descending order, while the lower two circuits 96c and 96d similarly receive the even-numbered first-stage outputs in descending order. The switch circuits in bank 98 receive bank 96's outputs in the same manner.

By following the resultant signal paths, one can see that the output bits can be so reordered as to enable the proper data to be selected for a given scan. In particular, the multiplexer controller 108 receives a TOTAL_ROW_COUNT signal from the sequencer 40. The TOTAL_ROW_COUNT signal represents the number of the current display scan line, and the multiplexer controller 108 generates the different switch banks' multiplexer-selection signals in accordance with that count's three least-significant bits.

If there are four pixels' worth of data in each memory byte, for instance, the multiplexer controller 108 generates its outputs in accordance with the table of FIG. 12. By following the resultant signal paths through FIG. 10, one can see that the signals on the omega network's input bit lines [1:0] appear on the omega network's top two output lines 110 and 112 during scan line zero. One can similarly see that the signals from lines [3:2], [5:4], and [7:6] respectively appear on those output lines during the scanning of the first, second, and third display rows. So if the look-tip table is so arranged that its outputs depend only on the top two bits, successive sequencing through the same memory locations will result in selection of the proper pixel data.

Reflection will reveal that the same network can be employed when there are one, two, four, or eight pixels' worth of data in each location. If each location contains a single pixel's worth of data, all switches' select inputs have the value that the drawings represent as zero, and FIGS. 13 and 14 respectively give the switch selections for one bit per pixel and four bits per pixel.

For products in which the pressure to contain cost is particularly acute, it may be preferable to modify the design in such a manner as to reduce the required memory speed. A review of the foregoing embodiment's portrait-mode operation reveals that refresh slots must occur at the same rate as display pixels are refreshed: their frequency must equal the pixel clock's. This means that the image memory 18's clock must be twice that fast if access is to be accorded both to the display device and to the host interface. Employing the organization that FIG. 15 depicts reduces this speed requirement.

FIG. 15 shows that the image memory 18 can actually be operated as two separate modules 120 and 122. As FIG. 5 indicates, the UPDATE_ADDRESS signal produced by the host interface is received by an address-translation circuit 124. The addresses that the host interface supplies specify a memory space that FIG. 8 depicts, but the address-translation circuit 124 converts those address values so that they result in an address space illustrated in FIG. 16.

FIG. 8's first and second rows represent the memory locations in which the first two rows of portrait-mode image data are stored. In the FIG. 16 organization, the same data are stored in respective first rows of the memory allocated for that image in FIG. 15's two modules 120 and 122. That is, each module receives every second row's data. Therefore, when a given memory address is applied to both of the modules 120 and 122, during a refresh cycle, data are simultaneously fetched from corresponding image locations in two successive image rows. This means that data for two adjacent pixels in the same display row are fetched simultaneously, so only one refresh memory cycle is required for every two display pixels.

As FIG. 15 shows, respective omega circuits 130 and 132 receive the outputs of the two memory modules 120 and 122, producing the bit order described above and applying the results to respective latches 134 and 136 when a multiplexer 137 forwards its upper input as its output to latch 134. In that state, the MEM_CLK signal clocks the respective omega-network values into latches 134 and 136, and it also clocks a further feedback-wired latch 140, thereby toggling latch 140's output so that multiplexer 137 forwards latch 136's thus-latched output to latch 134 during the next MEM_CLK interval.

During that interval, which is an update slot rather than a display slot, the signals applied to the omega network 130 and 132 are not display data, so the data clocked into latch 136 at the end of that interval are not valid. But latch 134's input is the (valid) data that latch 136 stored as a result of the previous MEM_CLK pulse, so latch 134 sequentially produces the outputs from respective memory modules 120 and 122 in response to successive clock pulses. Since latch 134 thus ends up producing valid display data both during the display slot and during the update slot, the memory clock does not have to be twice as fast as the pixel clock, so the memory can be less expensive.

From a programming standpoint, it is convenient for the memory addresses to be specified as though the organization were that of FIG. 8 rather than that of FIG. 16. For this reason, FIG. 5's address-translation circuitry 124 converts from one address form to the other. FIG. 17 depicts FIG. 5's address-translated circuit 124 in more detail. The address-translation circuit receives the UPDATE_ADDRESS signal, which FIG. 5's multiplexer 138 ordinarily forwards to multiplexer 52 to produce the next MEM_ADDRESS signal applied to the memory modules during update time slots. But when the registers 36 indicate that the image has a portrait orientation and the system is to operate in a virtual-address mode, an AND gate 139 instead forwards a VIRTUAL_ADDRESS signal that the address-translation circuit 124 generates from UPDATE_ADDRESS.

To understand the principle of the address-translation circuit's operation, consider the relationship between the update addresses shown in FIG. 8 and the corresponding virtual addresses depicted in FIG. 16. As was mentioned above, the virtual-address scheme places alternate image rows in alternate memory modules. Therefore, FIG. 8's top row, containing hexadecimal addresses 2180-21BB, are placed in locations 10C0-10FB of the first memory module. Update addresses from FIG. 8's second row, namely, 21C0-21FB, are placed in FIG. 16's second memory module, but with virtual addresses the same as those to which FIG. 8's first-row addresses were converted.

Now, if one expands the hexadecimal addresses into binary addresses, one can see that the addresses in FIG. 8's first row differ from corresponding addresses in FIG. 8 second row only in the seventh bit, i.e., the bit that represents $2^6$, which is the difference, represented by the ROW_OFFSET signal, between corresponding column addresses in successive rows. Removal of this bit from one of FIG. 8's addresses yields the corresponding virtual address in FIG. 16. For this virtual-addressing scheme, the row offsets will always be arranged to be a power of two, so this relationship will always prevail. That is, the two update addresses that result in the same virtual address will differ in only a single bit, and that bit indicates the memory module in which to store the associated data.

FIG. 17 shows that the address-translation circuitry 124 implements this principle. Since a single bit will be removed from the update address to produce the virtual address, UPDATE_ADDRESS[15:0] is converted to VIRTUAL_ADDRESS[14:0]. Also, we assume that the row offset is not likely to be more than $2^7$—that is, the bit to be removed will not be in the high address byte-so UPDATE_ADDRESS [15:8] becomes VIRTUAL_ADDRESS[14:7], as the drawing indicates.

Since we assume that UPDATE_ADDRESS[7] may be the bit that is dropped, though, VIRTUAL_ADDRESS[6] can be either UPDATE_ADDRESS[7] or UPDATE_ADDRESS[6], so a multiplexer 142a selects between these two possibilities in accordance with the value of ROW_OFFSET[7]

Multiplexer 142b similarly generates VIRTUAL_ADDRESS[5] by choosing between UPDATE_ADDRESS [6] and UPDATE_ADDRESS[5]. If ROW_OFFSET[6] or ROW_OFFSET[7] is asserted, then multiplexer 142b selects UPDATE_ADDRESS[5] as the value of VIRTUAL_ADDRESS[5]. Otherwise, it forwards UPDATE_ADDRESS[6]. Multiplexers 142c–f operate similarly: if the corresponding ROW_OFFSET bit or any higher-significance ROW_OFFSET bit is set, then the VIRTUAL_ADDRESS bit is the same as the corresponding UPDATE_ADDRESS bit. Otherwise, it is the same as the next-less-significant ROW_OFFSET bit. On updates, the CPU often gives a single address for its four-byte output, but only two bytes of that output can be written into the appropriate two-byte-wide memory module during any single CPU slot. So a sequencer output CYCLE_CONTROL causes multiplexer 142g to alternate between UPDATE_ADDRESS[0] and its complement on successive CPU slots to store the two two-byte words in successive locations.

As was just explained, the bit removed from the update address to produce the virtual address specifies which of the two memory banks is to receive the data. FIG. 18 depicts the circuitry for generating the chip-selection signals in accordance with that bit. That circuit includes a plurality of multiplexers 148a–f, each of which takes a corresponding bit of ROW_OFFSET as its selection signal. If a given ROW_OFFSET bit is asserted, the corresponding multiplexer 148 forwards as its output the corresponding bit of the UPDATE_ADDRESS. Otherwise, it forwards the output of the multiplexer above it. Since the value that ROW_OFFSET represents is a power of 2, only one of its bits will be set, so only one of the multiplexers will forward its corresponding bit of UPDATE_ADDRESS. Except for multiplexer 148a, all of the others will forward the output of the above multiplexer's output to the multiplexer below. So the output of multiplexer 148f is the value of the UPDATE_ADDRESS bit that corresponds to the (sole) asserted bit of ROW_ADDRESS. The two address modules respectively receive this value and its complement as CHIP_SELECT_0 and CHIP_SELECT_1.

The foregoing discussion demonstrates that the present invention can be practiced in a wide range of embodiments to afford programming ease and display flexibility. It therefore constitutes a significant advance in the art.

What is claimed is:

1. A computer system comprising:
A) a central-processing unit for generating update data signals representing the values of picture elements arrayed in image-pixel rows and columns and for generating corresponding update-address signals identifying rows and columns of the picture elements whose values the update data signals represent; and
B) display system that includes:
i) an image memory comprising N separately operable memory modules numbered 0 to N–1 that together provide memory locations organized in memory-location rows and columns, the (n mod N)th memory module containing the nth memory-location row, the image memory being responsive to update data signals representing the values of picture elements arrayed in image-pixel rows and columns, and to corresponding update-address signals identifying rows and columns of the picture elements whose values the update data signals represent, to store in only one module at a time the values represented by the update data signals in memory-location rows and columns identified by corresponding update-address signals, the image memory further generating memory output signals simultaneously representing the contents of the memory locations in all memory modules identified by refresh-address signals applied thereto;
ii) a refresh-address generator for generating and applying to the image memory refresh-address signals that sequentially identify successive memory-row positions along each of a plurality of successively scanned memory columns; and
iii) a display device for displaying, in successive display column positions along a respective display row, the pixel values represented by the memory output signals generated in response to the refresh-address signals that identify successive memory-row positions along each of the plurality of successively scanned memory columns.

2. A computer system as defined in claim 1 wherein:
A) each said memory location contains M pixel values;
B) the memory refresh-address signals sequentially identify successive memory-row positions along each of the plurality of the scanned memory columns M times in succession before sequentially identifying successive memory-row positions along the next memory column;
C) the memory output signals represent each said memory location's contents as a bit sequence; and
D) the display system further includes a bit-re-ordering network, interposed between the image memory and the display device, that re-orders the bit sequences in accordance with a re-ordering scheme that differs for each of the M times in succession that the memory refresh-address signals sequentially identify successive memory-row positions along a given memory column.

3. A computer system as defined in claim 2 wherein the bit-re-ordering network includes an omega network.

4. A display system as defined in claim 3 wherein the omega network is a three-stage omega network.

5. A computer system as defined in claim 1 wherein N=2.

6. A computer system comprising:
A) a central-processing unit for generating update data signals representing the values of picture elements arrayed in image-pixel rows and columns and for generating corresponding update-address signals identifying rows and columns of the picture elements whose values the update data signals represent; and B) a display system that includes:
  i) an image memory comprising memory locations organized in memory-location rows and columns and responsive to update data signals representing the values of picture elements arrayed in image-pixel rows and columns, and to corresponding update-address signals identifying rows and columns of the picture elements whose values the update data signals represent, for so storing the values represented by the update data signals in memory-location rows and columns identified by corresponding update-address signals that each said memory location contains M pixel values, the image memory further generating memory output signals representing as respective bit sequences the contents of the memory locations identified by refresh-address signals applied thereto;
  ii) a refresh-address generator for generating and applying to the image memory refresh-address signals that sequentially identify successive memory-row positions along each of a plurality of successively scanned memory columns M times in succession before sequentially identifying successive memory-row positions along the next memory column;
  iii) a bit-re-ordering network that generates re-ordered bit sequences by re-ordering the bit sequences in accordance with a re-ordering scheme that differs for each of the M times in succession that the memory refresh-address signals sequentially identify successive memory-row positions along a given memory column, and
  iv) a display device for displaying, in successive display column positions along a respective display row, the pixel values represented by predetermined bits of the re-ordered bit sequences that result from the memory output signals generated in response to the refresh-address signals that identify successive memory-row positions along each of the plurality of successively scanned memory columns.

7. A computer system as defined in claim 6 wherein the bit-re-ordering network includes an omega network.

8. A computer system as defined in claim 7 wherein the omega network is a three-stage omega network.

9. A display system that includes:
A) an image memory comprising N separately operable memory modules numbered 0 to N−1 that together provide memory locations organized in memory-location rows and columns, the (n mod N)th memory module containing the nth memory-location row, the image memory being responsive to update data signals representing the values of picture elements arrayed in image-pixel rows and columns, and to corresponding update-address signals identifying rows and columns of the picture elements whose values the update data signals represent, to store in only one module at a time the values represented by the update data signals in memory-location rows and columns identified by corresponding update-address signals, the image memory further generating memory output signals simultaneously representing the contents of the memory locations in all memory modules identified by refresh-address signals applied thereto;
B) a refresh-address generator for generating and applying to the image memory refresh-address signals that sequentially identify successive memory-row positions along each of a plurality of successively scanned memory columns; and
C) a display device for displaying, in successive display column positions along a respective display row, the pixel values represented by the memory output signals generated in response to the refresh-address signals that identify successive memory-row positions along each of the plurality of successively scanned memory columns.

10. A display system as defined in claim 9 wherein:
A) each said memory location contains M pixel values;
B) the memory refresh-address signals sequentially identify successive memory-row positions along each of the plurality of the scanned memory columns M times in succession before sequentially identifying successive memory-row positions along the next memory column;
C) the memory output signals represent each said memory location's contents as a bit sequence; and
D) the display system further includes a bit-re-ordering network, interposed between the image memory and the display device, that re-orders the bit sequences in accordance with a re-ordering scheme that differs for each of the M times in succession that the memory refresh-address signals sequentially identify successive memory-row positions along a given memory column.

11. A display system as defined in claim 10 wherein the bit-re-ordering network includes an omega network.

12. A display system as defined in claim 11 wherein the omega network is a three-stage omega network.

13. A display system as defined in claim 9 wherein N=2.

14. A display system that includes:
A) an image memory comprising memory locations organized in memory-location rows and columns and responsive to update data signals representing the values of picture elements arrayed in image-pixel rows and columns, and to corresponding update-address signals identifying rows and columns of the picture elements whose values the update data signals represent, for so storing the values represented by the update data signals in memory-location rows and columns identified by corresponding update-address signals that each said memory location contains M pixel values, the image memory further generating memory output signals representing as respective bit sequences the contents of the memory locations identified by refresh-address signals applied thereto;
B) a refresh-address generator for generating and applying to the image memory refresh-address signals that sequentially identify successive memory-row positions along each of a plurality of successively scanned memory columns M times in succession before sequentially identifying successive memory-row positions along the next memory column;
C) a bit-re-ordering network that generates re-ordered bit sequences by re-ordering the bit sequences in accordance with a re-ordering scheme that differs for each of the M times in succession that the memory refresh-address signals sequentially identify successive memory-row positions along a given memory column, and
D) a display device for displaying, in successive display column positions along a respective display row, the pixel values represented by predetermined bits of the re-ordered bit sequences that result from the memory output signals generated in response to the refresh-address signals that identify successive memory-row positions along each of the plurality of successively scanned memory columns.

15. A display system as defined in claim 14 wherein the bit-re-ordering network includes an omega network.

16. A display system as defined in claim 15 wherein the omega network is a three-stage omega network.

* * * * *